US008144355B2

(12) United States Patent
Nelson et al.

(10) Patent No.: US 8,144,355 B2
(45) Date of Patent: Mar. 27, 2012

(54) METHOD AND APPARATUS FOR IMPROVING RASTER IMAGE PROCESSING PERFORMANCE FOR VARIABLE INFORMATION PRINTING HAVING REUSABLE OBJECTS

(75) Inventors: William E. Nelson, Penfield, NY (US); James M. Sweet, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 285 days.

(21) Appl. No.: 12/647,117

(22) Filed: Dec. 24, 2009

(65) Prior Publication Data

US 2011/0157619 A1 Jun. 30, 2011

(51) Int. Cl.
*G06F 15/00* (2006.01)
*G06K 1/00* (2006.01)
*H04N 1/40* (2006.01)

(52) U.S. Cl. .................... 358/1.15; 358/1.9; 358/2.1

(58) Field of Classification Search .................. None
See application file for complete search history.

(56) References Cited

U.S. PATENT DOCUMENTS

| 6,032,004 | A | 2/2000 | Mirabella, Jr. et al. |
| 6,324,305 | B1 | 11/2001 | Holladay et al. |
| 6,373,981 | B1 | 4/2002 | De Queiroz et al. |
| 6,650,261 | B2 | 11/2003 | Nelson et al. |
| 6,731,814 | B2 | 5/2004 | Zeck et al. |
| 6,804,401 | B2 | 10/2004 | Nelson et al. |
| 7,307,760 | B2 | 12/2007 | Jacobs et al. |
| 7,493,489 | B2 | 2/2009 | De Queiroz |
| 7,538,910 | B2 | 5/2009 | Czudak et al. |

*Primary Examiner* — Thierry Pham
(74) *Attorney, Agent, or Firm* — Gibb I.P. Law Firm, LLC

(57) ABSTRACT

A method receives, at a processor of a printing apparatus, a variable information print job. The variable information print job is processed into upper planes of the record-specific objects, upper planes of the reusable objects, lower planes of the record-specific objects, and lower planes of the reusable objects. The method stores such objects within a storage medium of the printing apparatus. The method combines ones of the compressed upper planes of the record-specific objects and the compressed upper planes of the reusable objects corresponding to the record of the variable information print job using the processor to create a single compressed upper plane for the record within an output buffer of the printing apparatus and creates an ordered list (corresponding to the record) of lower plane tiles by assembling the compressed lower planes of the record-specific objects and the compressed lower plane reusable objects. The method performs a printing operation for the record of the variable information print job by decompressing multiple ones of the lower plane tiles in a predetermined order to form a lower plane of the record into an output raster page, decompressing the single compressed upper plane of the record into the output raster page, and outputting the output raster page to a printing engine of the printing apparatus to print the record of the variable information print job on print media.

20 Claims, 4 Drawing Sheets

METHOD AND APPARATUS FOR IMPROVING RASTER IMAGE PROCESSING PERFORMANCE FOR VARIABLE INFORMATION PRINTING HAVING REUSABLE OBJECTS

BACKGROUND AND SUMMARY

Embodiments herein generally relate to electrostatographic printers and copiers or reproduction machines, and more particularly, concerns a method of preparing data for printing by a digital printing apparatus.

RIP (Raster Image Processing) performance is a performance metric for digital front ends (DFE) of printers. Print servers attempt to improve RIP performance for variable imaging (VI) and certain other types of jobs by identifying reusable objects, imaging and compressing them, caching them, and then expanding and assembling them onto the final page when they are needed. In this regard an "object" is defined as an image, graphic item, portion of text, any combination of the three, or any other item that can appear on the printed page and which can be reused by various different instances of the print job. Currently, all of these operations are performed during RIP time. Each cached object must be imaged and compressed when it is first created, and then each time it is used it must be expanded and assembled, after which the final page is compressed again. These operations are processor cycle intensive, which would require expensive hardware and print servers use special optimizations to avoid full page assembly when possible, but for some jobs it is unavoidable.

In view of these issues, embodiments herein provide various methods of preparing data for printing by a digital printing apparatus. Exemplary method embodiments herein receive, by a processor of the printing apparatus, a variable information print job. The variable information print job comprises reusable objects and record-specific objects. The method herein processes each of these objects into a dual-plane representation. The upper plane is compressed via a run-length coding (RLC) that includes the capability of transparent pixel runs signifying areas in which the lower plane should be visible. The lower plane of the object is JPEG compressed. The method also stores the compressed reusable objects and the compressed record-specific objects within a storage medium of the printing apparatus.

The embodiments herein combine ones of the compressed upper planes of the record-specific objects and the compressed upper planes of the reusable objects that correspond to the record of the variable information print job (using the processor) to create a single compressed upper plane for the record within an output buffer of the printing apparatus. This process of combining the upper planes is performed without decompressing the compressed upper planes of the record-specific objects or the reusable objects.

Further, the method creates an ordered list (corresponding to the record) of lower plane tiles by assembling the compressed lower planes of the record-specific objects and the compressed lower planes of the reusable objects.

The methods herein also perform a printing operation for the record of the variable information print job. This is done by decompressing multiple ones of the lower plane tiles in a predetermined order to form a lower plane of the record into an output raster page. The printing operation also decompresses the single compressed upper plane of the record into the output raster page. Then, the output raster page is output to a printing engine of the printing apparatus to print the record of the variable information print job on print media.

The process of combining the upper planes of the objects includes parsing the compressed upper planes of the record-specific objects and the reusable objects into at least one pixel run. Then, starting with a topmost object the method identifies whether each pixel run is transparent or opaque. If the pixel run is an opaque pixel run, the method outputs the opaque pixel run to the output buffer unchanged. If the pixel run is a transparent pixel run, the method replaces the transparent pixel run with a relative next lowest opaque pixel run before outputting the transparent pixel run to the output buffer.

Apparatus embodiments are also disclosed herein. One exemplary printing apparatus embodiment includes one or more processors that receive the variable information print job. The processor(s) processes each of reusable objects and the record-specific objects into a dual-plane representation. The upper plane is compressed via a run-length coding (RLC) that includes the capability of transparent pixel runs signifying areas in which the lower plane should be visible. The lower plane of the object is JPEG compressed.

A storage medium is operatively connected to the processor. The storage medium stores the dual-plane compressed objects (reusable as well as record-specific). The storage medium also stores instructions executable by the processor to allow the printing apparatus to print the variable information print job.

An output buffer is operatively connected to the processor and a printing engine is operatively connected to the processor and the output buffer. The processor combines ones of the compressed upper planes of the record-specific objects and the compressed upper planes of the reusable objects corresponding to the record of the variable information print job to create a single compressed upper plane for the record within the output buffer. Further, the processor creates an ordered list (corresponding to the record) of lower plane tiles by assembling the compressed lower planes of the record-specific objects and the compressed lower planes of the reusable objects.

The processor also performs a printing operation for the record of the variable information print job. The processor decompresses multiple ones of the lower plane tiles in a predetermined order to form a lower plane of the record into an output raster page. The processor also decompresses the single compressed upper plane of the record into the output raster page. Then the processor can output the output raster page to a printing engine of the printing apparatus to print the record of the variable information print job on print media.

The process of combining the upper planes of the objects by the processor comprises parsing the compressed upper planes of the record-specific objects and the compressed upper planes of the reusable objects into at least one pixel run, starting with a topmost object to identify whether each pixel run is transparent or opaque. If the pixel run is an opaque pixel run, the processor outputs the opaque pixel run to the output buffer unchanged. If the pixel run is a transparent pixel run, the processor replaces the transparent pixel run with a relative next lowest opaque pixel run before outputting the transparent pixel run to the output buffer.

With the embodiments herein, the objects are only compressed a single time for each record that is printed. Therefore, when the upper plane objects are combined, the process is performed without decompressing either of the compressed objects. In other words, the embodiments herein combine the upper plane objects while they are in a compressed state, which avoids having to decompress either object in order to combine them. This allows the process to be so fast that the raster image processing can be performed simultaneously with the printing operation.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, with conventional raster image processing (RIP) each cached object must be imaged and compressed when it is first created, and then each time it is used it must be expanded and assembled, after which the final page is compressed again. These operations slow the printer, and consume unnecessarily large amounts of computing resources.

The embodiments herein improve raster image processing performance of variable information print jobs with cached reusable objects by avoiding redundant decompression and compression steps when handling reused objects. For example, embodiments herein can store lossless data using Run-length Coding (RLC), which can be rapidly assembled at RIP-time via a "weaving" process described below. Further, the embodiments herein can defer assembly of lossy data until print-time by storing each object's lossy data as independent tiles of JPEG data; and by maintaining the resolution of each tile of JPEG data independently in order to perform compression and expansion operations at their native resolution.

One performance metric for digital front ends of printers is raster image processing performance. Improving the raster image processing performance of a digital front end increases the customer satisfaction and provides a competitive advantage in the digital front end market. A considerable amount of processing cycles of a digital front end are consumed during the raster image processing operations at which time a print job in a Page Description Language such as PostScript® (available from Adobe Corporation, San Jose Calif., USA) is converted into a ready-to-print format. The details of raster image processing are well-known to those ordinarily skilled in the art (for example see U.S. Pat. No. 7,307,760 the complete disclosure of which is incorporated herein by reference) and a complete discussion of such concepts is intentionally omitted so as to focus the reader on the salient aspects of the invention.

In order to improve the performance of variable imaging (VI) jobs and portable document format (PDF) jobs with reusable images, embodiments herein identify imaging objects that are reusable and store both the upper and lower planes of such objects. While this path improves raster image processing performance by eliminating the need for redundant imaging, it still can be performance intensive. The details of variable information and variable imaging print jobs are well-known to those ordinarily skilled in the art (for example see U.S. Pat. No. 7,538,910 the complete disclosure of which is incorporated herein by reference) and a complete discussion of such concepts is intentionally omitted so as to focus the reader on the salient aspects of the invention.

Figure 1:
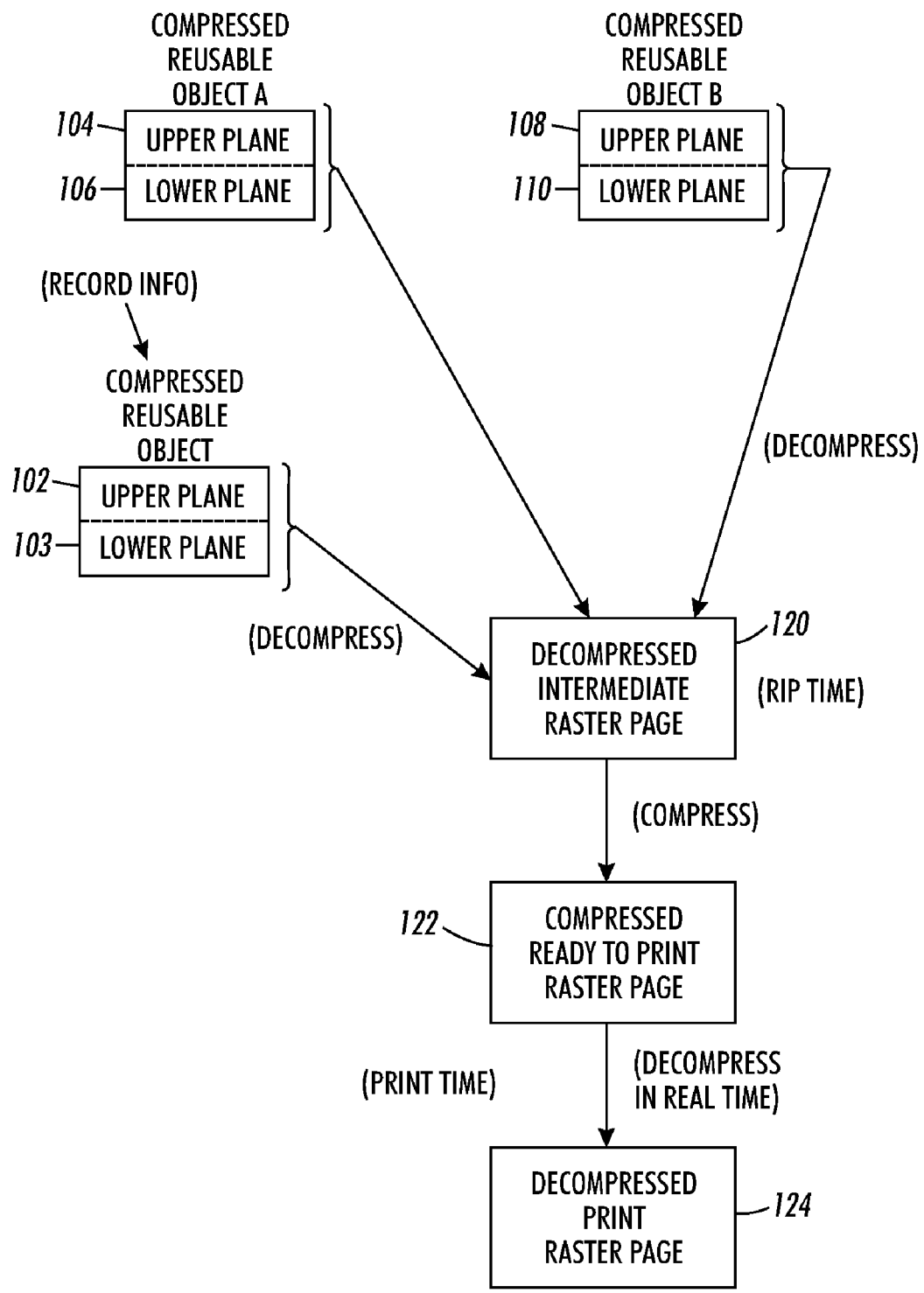
FIG. 1 is a schematic diagram of a variable information printing objects combined into raster pages according to embodiments herein.

For example, as illustrated in FIG. 1, compressed reusable objects A and B have upper plane objects 104 and 110 and lower plane objects 106 and 108. Each time an object is used; the compressed reusable objects A and B and the record specific object are expanded (decompressed) as a whole (both the upper planes and the lower planes) and assembled onto a canvas to create a compressed intermediate raster page 120. In this respect, the term "canvas" is defined as a blank image representation in memory onto which other images can be placed. Then the final page is recompressed as ready-to-print data 122. If any of the objects were cached at a lower resolution, they must be scaled up at raster image processing-time during the assembly of the intermediate raster page 120, and then recompressed at full resolution in the ready-to-print raster page 122.

Figure 2:
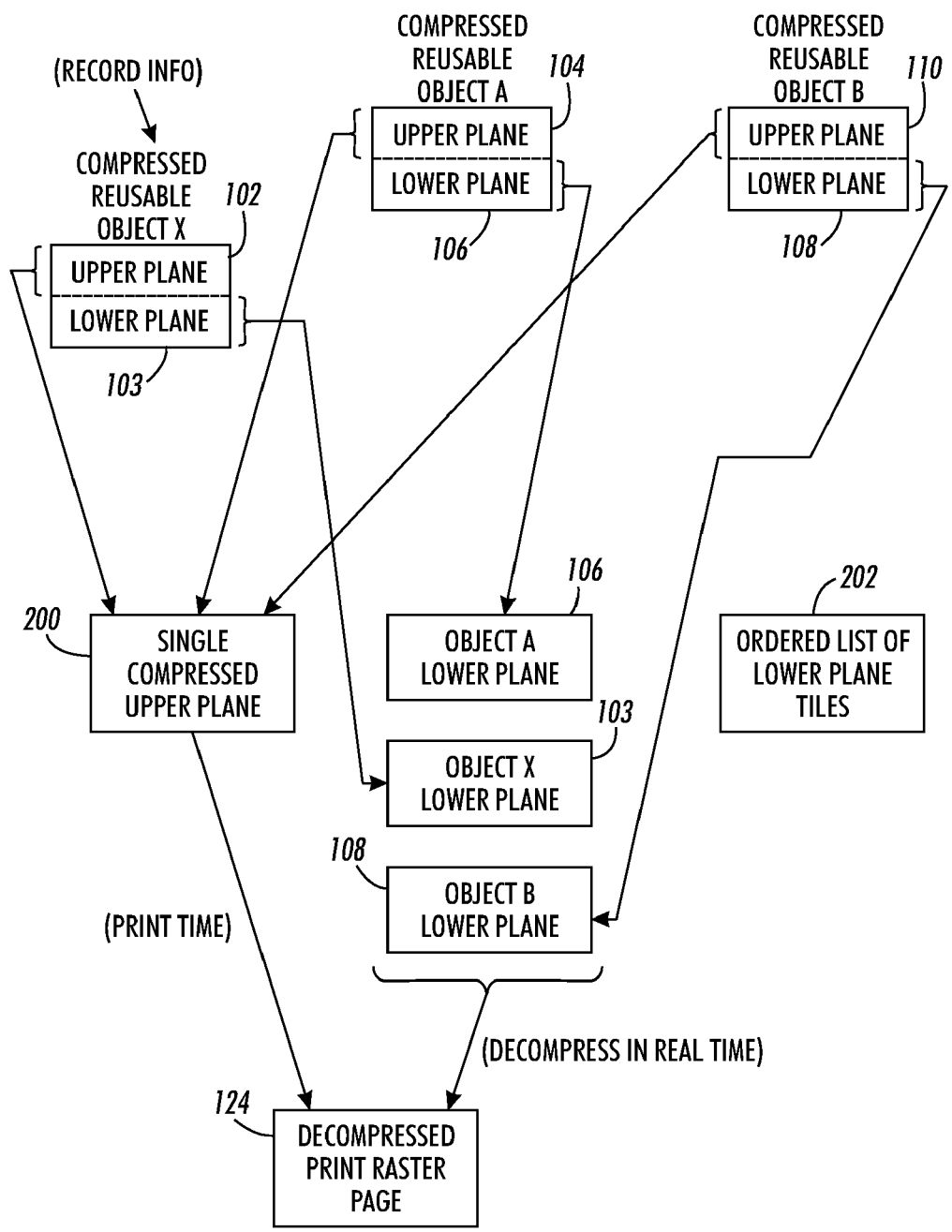
FIG. 2 is a schematic diagram of a variable information printing objects combined into raster pages according to embodiments herein.

In order to increase digital front end performance, the embodiment illustrated in FIG. 2 eliminates the redundant expansion and re-compression to minimize the amount of processing resources required. To the contrary, the lower planes 103, 106, 108 of objects X, A, and B are not decompressed, but are assembled into an ordered list of lower plane tiles 202. The ordered list (corresponding to the record) of lower plane of tiles 202 eventually becomes the lower plane of the record.

As shown in FIG. 2, the compressed upper planes of the record-specific objects 102 of object X and the compressed upper planes of the reusable objects 104 and 110 of objects A and B are combined (weaved among one another) into a single combined compressed upper plane raster page 200 without ever being decompressed (expanded). Then, this single compressed upper plane 200 for the record can be decompressed in real time to form the decompressed print raster page 124.

Thus, as shown in FIG. 2, this embodiment performs assembly operations at raster image processing-time. In this regard the phrase "assembly operations" means the work required to get a single ready-to-print image (that can be expanded) into the raster output that is supplied to the printer. The embodiments herein do some of the assembly operations at the time of raster image processing (where the embodiments herein weave the RLC data) but the embodiments herein defer some of the assembly operations to printing time, namely, the combining of the lossy information. Because the lossy information exists as a set of tiles that may overlap, may contain mask of data, and/or may have different solutions, the assembly operations of the embodiments herein are not completed until print-time. This is in contrast to conventional methods where all of the assembly operations are performed at raster image processing time (which results in a single compressed image, as described above). The embodiments herein also stand in contrast to conventional processes that defer all assembly operations to a later time (e.g., printing time).

The format of the single compressed upper plane for the record 200 is a single lossless plane (e.g., stored as Run-length Coded (RLC) data) together with any number of independent tiles of lossy data (e.g., JPEG data (an image coding standard named for the committee that created the standard—Joint Photographic Experts Group)). The JPEG tiles are associated with a resolution, a position within the image as a whole, and optional mask data. In this regard, "mask data"

generally represents a map of which pixels in the image tiles are opaque (replace previously imaged data on the canvas) and which pixels are transparent (do not alter the canvas). A compression process which is lossless maintains all information of each compressed object (without any loss) while a compression process that is lossy loses some information of each the compressed object. The details of compression technologies are well-known to those ordinarily skilled in the art (for example see U.S. Pat. No. 7,493,489 the complete disclosure of which is incorporated herein by reference) and a complete discussion of such concepts is intentionally omitted so as to focus the reader on the salient aspects of the invention.

Thus, each cached object is stored as in compressed format. When an assembly operation is requested, the stored compressed objects can be efficiently combined into a single file by weaving together the RLC data, and by simply concatenating the lists of JPEG tiles and adjusting their positions according to the assembly information provided by the imager.

At print-time, each JPEG tile is expanded, scaled if necessary, and positioned into the appropriate location in the output buffer according to the position and optional mask information. The combined RLC data is expanded on top of this. (In specific embodiments, implementations may re-order or combine some of these operations for efficiency, but the conceptual order of operations and output is unchanged). Therefore, the lower plane of the record is formed first from multiple tiles, and then the single compressed upper plane is expanded and placed on top of the lower plane to form the final image of the record.

Figure 3:
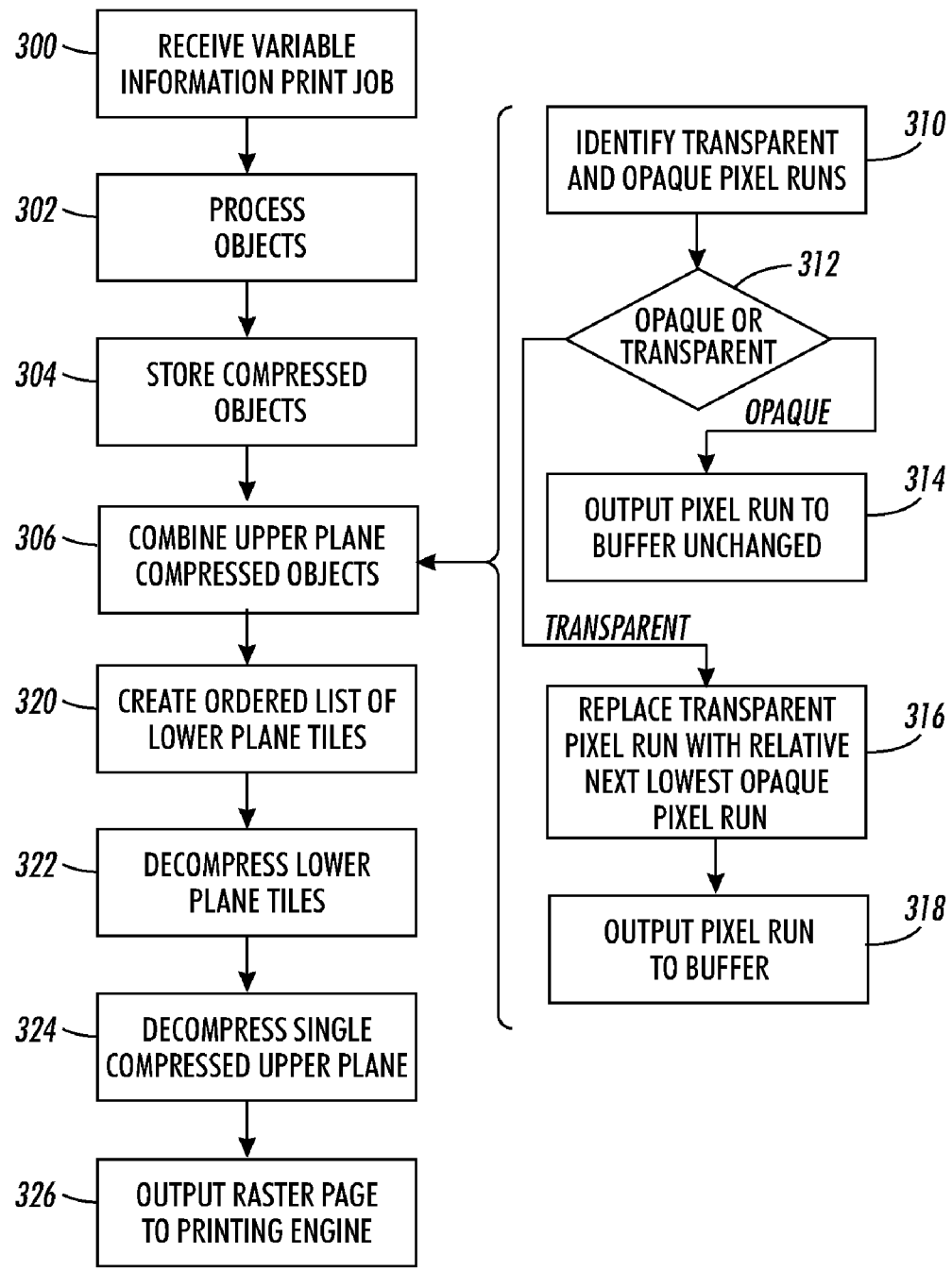
FIG. 3 is a flowchart illustrating method embodiments herein.
Figure 4:
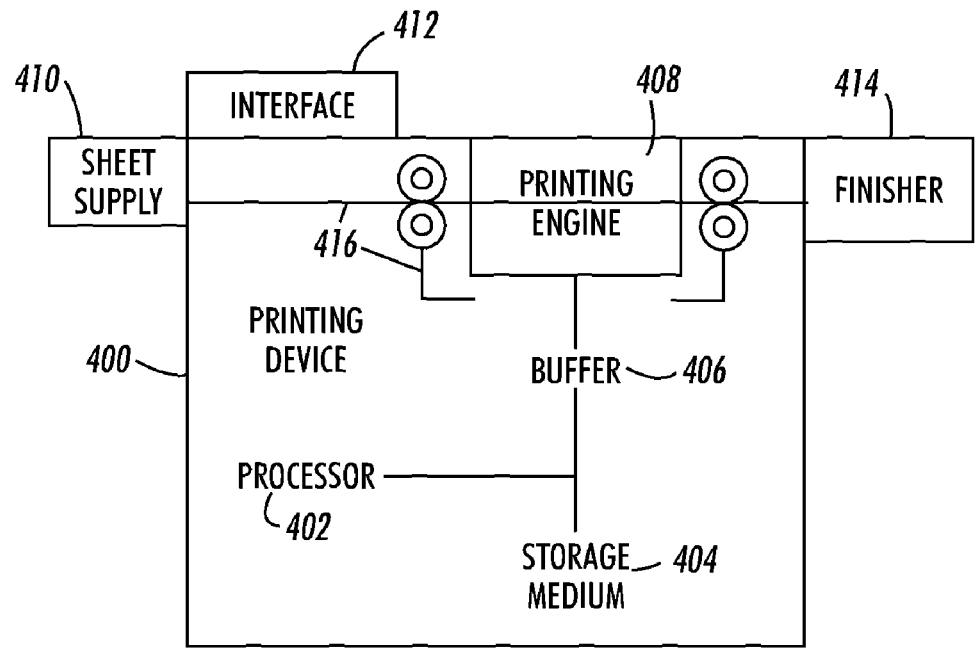
FIG. 4 is a schematic diagram of a printing apparatus according to embodiments herein.

More specifically, referring now to FIG. 3, as shown in flowchart form exemplary method embodiments herein receive, at a processor of the printing apparatus, a variable information print job in item 300. The variable information print job comprises reusable objects and record-specific objects. The method herein processes each of these objects into a dual-plane representation. The upper plane is compressed via a run-length coding (RLC) that includes the capability of transparent pixel runs signifying areas in which the lower plane should be visible. The lower plane of the object is JPEG compressed. Such objects are later stored to disk. The details of methods that process compressed reusable objects and compressed record specific objects into compressed upper planes of the record-specific objects, compressed upper planes of the reusable objects, compressed lower planes of the record-specific objects, and compressed lower planes of the reusable objects are well-known to those ordinarily skilled in the art (for example see U.S. Pat. No. 6,373,981, the complete disclosure of which is incorporated herein by reference) and a complete discussion of such concepts is intentionally omitted so as to focus the reader on the salient aspects of the invention.

Methods herein process, using the processor, each of reusable objects and the record-specific objects into a dual-plane representation. The upper plane is compressed via a run-length coding (RLC) that includes the capability of transparent pixel runs signifying areas in which the lower plane should be visible. The lower plane of the object is JPEG compressed in item 302. The storage medium stores the dual-plane compressed objects (reusable as well as record-specific). The methods herein store the upper planes of the record-specific objects, the upper planes of the reusable objects, the lower planes of the record-specific objects, and the lower planes of the reusable objects within a storage medium of the printing apparatus in item 304.

Compressing processes reduce the object's storage size and can be either "lossless" or "lossy". A compression process which is lossless maintains all information of each compressed object (without any loss) while a compression process that is lossy loses some information of each the compressed object during the compression and decompression processes.

In item 306, the methods herein combine ones of the compressed upper planes of the record-specific objects and the compressed upper planes of the reusable objects that correspond to the record of the variable information print job (using the processor) to create a single compressed upper plane for the record within an output buffer of the printing apparatus.

This process of combining the upper planes is performed without decompressing either the compressed upper planes of the record-specific objects or the compressed upper planes of the reusable objects and is performed by a weaving process unique to the embodiments herein. This weaving process includes parsing the compressed upper planes of the record-specific objects and the compressed upper planes of the reusable objects into at least one pixel run. Then, starting with a topmost object the method identifies whether each pixel run is transparent or opaque in item 310.

Figure 5:
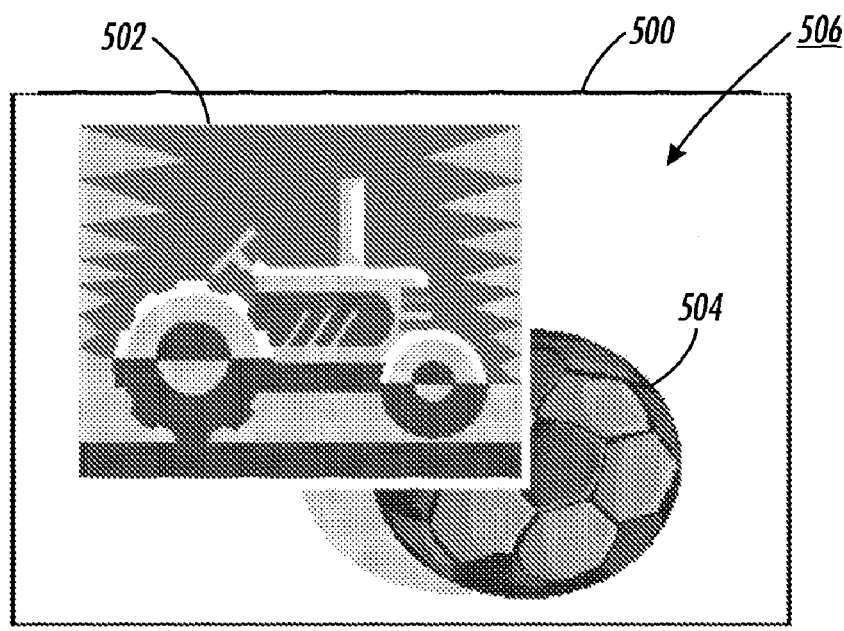
FIG. 5 is a schematic diagram of a printed record of a variable information print job according to embodiments herein.

The topmost object (which can also be referred to as the top object or a higher object) is the object that is not obscured by other objects. To the contrary, a lower object (which can also be referred to as the lower most object or bottom object) is generally obscured (at least in some portion) by higher objects. More specifically, as illustrated in FIG. 5, one record (specific instance of printing) of the variable information print job is illustrated as item 500. This record includes an image of a tractor 502 and an image of a soccer ball 504. The image of the tractor 502 overlies of the image of the soccer ball 504 and the tractor 502 is therefore the topmost object in this record and the soccer ball 504 is the next lowest object within this record 500. While only two objects are illustrated in record 500, those ordinarily skilled in the art would understand that many other objects could be include within a record and that the objects could comprise images, text, etc. (any other item capable of being printed). The areas of white space 506 in FIG. 5 are made up of transparent pixels, while the areas occupied by the objects 502, 504 are made up of opaque pixels. During the raster image processing and the print processing, the embodiments herein establish pixel runs for each of the objects in a manner that optimizes the performance of the printing engine.

If a pixel run is an opaque pixel run (item 312) the methods herein output the opaque pixel run to the output buffer unchanged (item 314). However, if the pixel run is a transparent pixel run, the methods replace the transparent pixel run with a relative next lowest opaque pixel run (item 316) before outputting the transparent pixel run to the output buffer (item 318).

Therefore, when performing a pixel run related to the topmost object 502, pixels within the rectangle 502 are opaque and are directly output to the buffer unchanged. Also when performing the pixel run related to the topmost object 502, pixels outside the rectangle 502 would be transparent. There is no underlying object in area 506 and therefore the transparent pixels are output to the buffer. However, with respect to the pixels within the circle 504, the embodiments herein looked to the next underlying object (the soccer ball object 504) when performing the pixel run for the transparent pixels of the topmost object (tractor 502). Thus, with respect to such transparent pixels the embodiments herein would look to the relative next lowest opaque pixel run relating to item 504 and replace the transparent pixels with the opaque pixels from object 504. This process continues for each pixel run within each object, from the topmost object to the bottommost object within the record. The details of combining image objects are well-known to those ordinarily skilled in the art (for example see U.S. Pat. No. 6,324,305 the complete disclosure of which is incorporated herein by reference) and a complete discussion of such concepts is intentionally omitted so as to focus the reader on the salient aspects of the invention.

Storing the data as raster-order RLC data enables the usage of such a very fast "weaving" method to perform the assembly. With the weaving methodology according to embodiments herein, pixel runs do not need to be fully expanded. Instead, the RLC data is parsed starting with the topmost image to identify whether each pixel run is transparent or opaque. Opaque pixel runs are passed through to the output unchanged. Transparent pixel runs are replaced with new data by parsing through the appropriate pixel runs in the next lower RLC image, handling opaque and transparent pixel runs in that image as with the one above it. If not all of an opaque run is of a lower RLC image is necessary to replace a transparent run in a higher image, the run is truncated by modifying the runlength field of the encoded run. If the bottommost image contains any transparent pixel runs, these are also parsed through unchanged. If desired, adjacent pixel runs with the same value can be coalesced to improve compression ratio. In all cases, the encoded run is parsed, but is never actually expanded into a raster pixel buffer. Instead, the encoded runs are copied to the output buffer, with a possible modification of the runlength field.

Since the weaving method combines the RLC data in the compressed space, the embodiments herein avoid the redundant steps of expanding the pixel runs into memory and then later recompressing the raster image. Therefore, embodiments herein are able to achieve a much higher throughput than the expand-assemble-compresses method.

Simultaneously with the process of combining the upper plane compressed objects in item 306, the methods herein also create an ordered list (corresponding to the record) of lower plane tiles by assembling the compressed lower plane tiles (103, 106, 108) from the compressed reusable objects 104, 110 and the compressed record-specific objects 102.

The methods herein perform a printing operation for the record of the variable information print job. This is done by decompressing multiple ones of the lower plane tiles in a predetermined order (aided by the print job) to form a lower plane of the record into an output raster page in item 322. The printing operation also decompresses the single compressed upper plane of the record into the output raster page in item 324. Then, the output raster page is output to a printing engine of the printing apparatus to print the record of the variable information print job on print media in item 326.

Apparatus embodiments are also disclosed herein. One exemplary printing apparatus embodiment 400 includes a processor 402 that receives the variable information print job. The printing apparatus 400 can receive the variable information job through some form of interface 412. This interface 412 can comprise a graphic user interface, a network interface (wired or wireless), a portable storage device interface, etc.

The processor 402 compresses the upper planes of the record-specific objects into compressed upper planes of the record-specific objects, the lower planes of the record-specific objects into compressed lower planes of the record-specific objects, the upper planes of the reusable objects into compressed upper planes of the reusable objects, and the lower planes of the reusable objects into compressed lower planes of the reusable objects. A storage medium 404 (that is operatively connected to (e.g., directly or indirectly connected to) the processor 402) stores the compressed upper planes of the record-specific objects, the compressed upper planes of the reusable objects, the compressed lower planes of the record-specific objects, and the compressed lower planes of the reusable objects within a storage medium of the printing apparatus, and stores instructions executable by the processor 402 to allow the printing apparatus 400 to print the variable information print job. More specifically, the storage medium 404 comprises any form of a computer storage medium (magnetic, optical, integrated circuit devices, etc.) that can store instructions (software) that can be executed by a computer or computerized device (digital front end, print processor, etc.). Further, an output buffer 406 is operatively connected to the processor 402 and a printing engine 408 is operatively connected to the processor 402 and the output buffer 406.

Using the instructions stored in the storage medium 404, the processor 402 combines ones of the compressed upper planes of the record-specific objects and the compressed upper planes of the reusable objects that correspond to the record of the variable information print job (using the processor) to create a single compressed upper plane for the record within the output buffer 406 of the printing apparatus 400.

When combining the compressed upper planes of the record-specific objects and compressed upper planes of the reusable objects, the processor 402 parses the compressed upper plane objects into at least one pixel run, starting with a topmost object to identify whether each pixel run is transparent or opaque. If the pixel run is an opaque pixel run, the processor 402 outputs the opaque pixel run to the output buffer 406 unchanged. However, if the pixel run is a transparent pixel run, the processor 402 replaces the transparent pixel run with a relative next lowest opaque pixel run before outputting the transparent pixel run to the output buffer 406.

The stored instructions allow the processor 402 to perform a printing operation for the record of the variable information print job. This is done by decompressing multiple ones of the lower plane tiles in a predetermined order to form a lower plane of the record into an output raster page. The printing operation also decompresses the single compressed upper plane of the record into the output raster page. Then, the output raster page is output to a printing engine 408 of the printing apparatus 400 to print the record of the variable information print job on print media. More specifically, a sheet of media (paper, transparencies, card stock, etc.) is drawn from a sheet supply 410, travels along a paper path 416 to the printing engine 408. The printing engine 408 makes marks on the media with ink, toner, or other similar material. After printing, the sheet of media can be re-routed to the printing engine 408 for duplex printing or can be forwarded to the finisher 414 to perform necessary sorting, stapling, folding, bookmaking, etc.

With the embodiments herein, the reusable objects are only compressed a single time for each record that is printed. Therefore, when the compressed upper planes of the objects are combined the process is performed without decompressing the upper planes of either of the compressed reusable objects and the compressed record-specific objects. In other words, the embodiments herein combine the upper planes of the reusable objects and the record-specific objects while they are in a compressed state, which avoids having to decompress either object in order to combine them. This allows the process to be very efficient, such that the raster image processing can be performed simultaneously with the printing operation.

With the embodiments herein, the expansion and assembly of the lossy data can be deferred to print-time when there are often unused processor cycles available. More specifically, there are a theoretically infinite number of processor cycles available at raster image processing-time, with the only a real limitation being customer patience. To the contrary, at print-time there is a true limitation because the processing is to be completed in time to deliver the data before the sheet passes the print zone. However, there are usually a large number of unused cycles at print-time and the embodiments herein take advantage of that processing space to perform a portion of the assembly operations. More specifically, the JPEG tiles are only expanded once (at print-time represented by the decompression between item 200 and item 124 in FIG. 2). As a result, the sum total of processor cycles required at all stages is reduced. For any JPEG tiles stored at a resolution lower than the print engine, scaling is delayed until after the expansion of each tile, thereby reducing the amount of data that must be expanded at print-time.

Further, with embodiments herein, multiple lower plane tiles are decompressed at print time (in a specific order) to from the lower plane of the record and a single upper plane is decompressed on top of the multiple lower plane tiles which more efficiently utilizes the resources within the printing device.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A method of preparing data for printing by a printing apparatus, said method comprising:

receiving, by a processor of said printing apparatus, a variable information print job, said variable information print job comprising record-specific objects and reusable objects;

processing said record-specific objects and reusable objects into upper planes of said record-specific objects, compressed upper planes of said reusable objects, compressed lower planes of said record-specific objects, and lower planes of said reusable objects;

storing said compressed upper planes of said record-specific objects, said compressed upper planes of said reusable objects, said compressed lower planes of said record-specific objects, and said compressed lower planes of said reusable objects within a storage medium of said printing apparatus;

combining ones of said compressed upper planes of said record-specific objects and said compressed upper planes of said reusable objects corresponding to said record of said variable information print job using said processor to create a single compressed upper plane for said record within an output buffer of said printing apparatus;

creating an ordered list of lower plane tiles by assembling said compressed lower planes of said record-specific objects and said compressed lower planes of said reusable objects; and performing a printing operation for said record of said variable information print job by:
   decompressing multiple ones of said lower planes of said record-specific objects and said lower planes of said reusable objects corresponding to said record in a predetermined order as separate tiles to form a lower plane of said record into an output raster page;
   decompressing said single compressed upper plane of said record into said output raster page; and
   outputting said output raster page to a printing engine of said printing apparatus to print said record of said variable information print job on print media.

2. The method according to claim 1, said combining being performed without decompressing either of said compressed upper planes of said record-specific objects or said compressed upper planes of said reusable objects.

3. The method according to claim 1, said compressing being performed simultaneously with said printing operation.

4. The method according to claim 1, said compressing comprising processes that reduce object storage size and that can be one of:
   maintain all information of each compressed object without any loss; and
   lose some information of each said compressed object.

5. The method according to claim 1, said compressing of said reusable objects being performed before said printing operation.

6. A method of preparing data for printing by a printing apparatus, said method comprising:

receiving, by a processor of said printing apparatus, a variable information print job, said variable information print job comprising record-specific objects and reusable objects;

processing said record-specific objects and reusable objects into compressed upper planes of said record-specific objects, compressed upper planes of said reusable objects, compressed lower planes of said record-specific objects, and compressed lower planes of said reusable objects;

storing said compressed upper planes of said record-specific objects, said compressed upper planes of said reusable objects, said compressed lower planes of said record-specific objects, and said compressed lower planes of said reusable objects within a storage medium of said printing apparatus;

combining ones of said compressed upper planes of said record-specific objects and said compressed upper planes of said reusable objects corresponding to said record of said variable information print job using said processor to create a single compressed upper plane for said record within an output buffer of said printing apparatus;

creating an ordered list of lower plane tiles by assembling said compressed lower planes of said record-specific objects and said compressed lower planes of said reusable objects; and performing a printing operation for said record of said variable information print job by:
  decompressing multiple ones of said lower planes of said record-specific objects and said lower planes of said reusable objects corresponding to said record in a predetermined order as separate tiles to form a lower plane of said record into an output raster page;
  decompressing said single compressed upper plane of said record into said output raster page; and
  outputting said output raster page to a printing engine of said printing apparatus to print said record of said variable information print job on print media, said combining comprising:
  parsing said compressed upper planes of said record-specific objects and said compressed upper planes of said reusable objects into at least one pixel run, starting with a topmost object to identify whether each pixel run is transparent or opaque;
  if said pixel run is an opaque pixel run, outputting said opaque pixel run to said output buffer unchanged; and
  if said pixel run is a transparent pixel run, replacing said transparent pixel run with a relative next lowest opaque pixel run before outputting said transparent pixel run to said output buffer.

7. The method according to claim 6, said combining being performed without decompressing either of said compressed upper planes of said record-specific objects or said compressed upper planes of said reusable objects.

8. The method according to claim 6, said combining being performed simultaneously with said printing operation.

9. The method according to claim 6, said compressing comprising processes that reduce object storage size and that can be one of:
  maintain all information of each compressed object without any loss; and
  lose some information of each said compressed object.

10. The method according to claim 6, said compressing of said reusable objects being performed before said printing operation.

11. A printing apparatus comprising:
  a processor that receives a variable information print job, said variable information print job comprising record-specific objects and reusable objects;
  said processor processing said record-specific objects and reusable objects into compressed upper planes of said record-specific objects, compressed upper planes of said reusable objects, compressed lower planes of said record-specific objects, and compressed lower planes of said reusable objects;
  a storage medium operatively connected to said processor that stores said compressed upper planes of said reusable objects, said compressed lower planes of said reusable objects, compressed upper planes of said record-specific objects, and said compressed upper planes of said reusable objects, and that stores instructions executable by said processor to allow said printing apparatus to print said variable information print job;
  an output buffer operatively connected to said processor; and
  a printing engine operatively connected to said processor and said output buffer,
  said processor combining ones of said compressed upper planes of said record-specific objects and said compressed upper planes of said reusable objects corresponding to said record of said variable information print job to create a single compressed upper plane for said record within said output buffer;
  said processor creating an ordered list of lower plane tiles by assembling said compressed lower planes of said record-specific objects and said compressed lower planes of said reusable objects; and
  said processor performing a printing operation for said record of said variable information print job by:
    decompressing multiple ones of said lower planes of said record-specific objects and said lower planes of said reusable objects corresponding to said record in a predetermined order as separate tiles to form a disjoint lower plane of said record into an output raster page;
    decompressing said single compressed upper plane of said record into said output raster page; and
    outputting said output raster page to a printing engine of said printing apparatus to print said record of said variable information print job on print media.

12. The apparatus according to claim 11, said combining being performed by said processor without decompressing either of said compressed upper planes of said record-specific objects or said compressed upper planes of said reusable objects.

13. The apparatus according to claim 11, said compressing being performed simultaneously with said printing operation.

14. The apparatus according to claim 11, said compressing comprising processes that reduce object storage size and that can be one of:
  maintain all information of each compressed object without any loss; and
  lose some information of each said compressed object.

15. The apparatus according to claim 11, said compressing being performed before said printing operation.

16. A printing apparatus comprising:
  a processor that receives a variable information print job, said variable information print job comprising record-specific objects and reusable objects;
  said processor processing said record-specific objects and reusable objects into compressed upper planes of said record-specific objects, compressed upper planes of said reusable objects, compressed lower planes of said record-specific objects, and compressed lower planes of said reusable objects;
  a storage medium operatively connected to said processor that stores said compressed upper planes of said reusable objects, said compressed lower planes of said reusable objects, compressed upper planes of said record-specific objects, and said compressed upper planes of said reusable objects, and that stores instructions executable by said processor to allow said printing apparatus to print said variable information print job;
  an output buffer operatively connected to said processor; and a printing engine operatively connected to said processor and said output buffer, said processor combining ones of said compressed upper planes of said record-specific objects and said compressed upper planes of said reusable objects corresponding to said record of said variable information print job to create a single compressed upper plane for said record within said output buffer;

said processor creating an ordered list of lower plane tiles by assembling said compressed lower planes of said record-specific objects and said compressed lower planes of said reusable objects; and said processor performing a printing operation for said record of said variable information print job by:

decompressing multiple ones of said lower planes of said record-specific objects and said lower planes of said reusable objects corresponding to said record in a predetermined order as separate tiles to form a disjoint lower plane of said record into an output raster page;

decompressing said single compressed upper plane of said record into said output raster page; and outputting said output raster page to a printing engine of said printing apparatus to print said record of said variable information print job on print media, said combining by said processor comprising:

parsing said compressed upper planes of said record-specific objects and said compressed upper planes of said reusable objects into at least one pixel run, starting with a topmost object to identify whether each pixel run is transparent or opaque;

if said pixel run is an opaque pixel run, outputting said opaque pixel run to said output buffer unchanged; and if said pixel run is a transparent pixel run, replacing said transparent pixel run with a relative next lowest opaque pixel run before outputting said transparent pixel run to said output buffer.

17. The apparatus according to claim 16, said combining being performed by said processor without decompressing either of said compressed upper planes of said record-specific objects or said compressed upper planes of said reusable objects.

18. The apparatus according to claim 16, said compressing being performed simultaneously with said printing operation.

19. The apparatus according to claim 16, said compressing comprising processes that reduce object storage size and that can be one of:

maintain all information of each compressed object without any loss; and lose some information of each said compressed object.

20. The apparatus according to claim 16, said compressing being performed before said printing operation.

* * * * *